United States Patent
Cansino et al.

(10) Patent No.: US 8,775,553 B2
(45) Date of Patent: Jul. 8, 2014

(54) MANAGING SIGNAL DELIVERY TO A PLURALITY OF DISPLAY PLATFORMS

(75) Inventors: Don E. Cansino, Brea, CA (US); Yeung K. Chan, Rancho Palos Verdes, CA (US); Brady C. Tsurutani, Los Angeles, CA (US); Yuming Wang, West Covina, CA (US); Yue Wu, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 397 days.

(21) Appl. No.: 12/877,767

(22) Filed: Sep. 8, 2010

(65) Prior Publication Data

US 2011/0087754 A1  Apr. 14, 2011

Related U.S. Application Data

(60) Provisional application No. 61/241,836, filed on Sep. 11, 2009.

(51) Int. Cl.
*G06F 15/16* (2006.01)

(52) U.S. Cl.
USPC ........... 709/217; 709/203; 709/218; 709/219; 709/223; 709/225; 709/226; 709/227; 709/229

(58) Field of Classification Search
USPC ......... 709/203, 217, 218, 219, 223, 225, 226, 709/227, 229
See application file for complete search history.

(56) References Cited

U.S. PATENT DOCUMENTS

| | | | |
|---|---|---|---|
| 7,509,407 B2* | 3/2009 | Miller et al. | 709/223 |
| 7,636,917 B2* | 12/2009 | Darling et al. | 718/105 |
| 2002/0087992 A1* | 7/2002 | Bengeult et al. | 725/76 |
| 2006/0120385 A1* | 6/2006 | Atchison et al. | 370/400 |
| 2006/0165092 A1* | 7/2006 | Wilson et al. | 370/395.21 |
| 2006/0200558 A1* | 9/2006 | Sherer et al. | 709/224 |
| 2006/0259588 A1* | 11/2006 | Lerman et al. | 709/219 |
| 2007/0250636 A1* | 10/2007 | Stephens | 709/231 |
| 2008/0170536 A1* | 7/2008 | Marshack et al. | 370/316 |
| 2009/0080368 A1* | 3/2009 | Bengeult et al. | 370/316 |
| 2009/0156183 A1* | 6/2009 | Cha | 455/414.2 |
| 2010/0112942 A9* | 5/2010 | Cannon et al. | 455/41.2 |
| 2010/0142447 A1* | 6/2010 | Schlicht et al. | 370/328 |

* cited by examiner

*Primary Examiner* — Liangche A Wang (57) ABSTRACT

Methods, apparatuses, and systems for managing signal delivery to a plurality of display platforms are disclosed. A system in accordance with one or more embodiments of the present invention comprises a centralized database, and a plurality of points of presence, each point of presence in the plurality of points of presence coupled to the centralized database, each point of presence comprising a management service and a data cache, wherein the management service maintains a data session with a client based on a comparison of information stored in the data cache and a current client request, the management service further comparing the current client request with the centralized database when the client is denied signal delivery from the system.

18 Claims, 7 Drawing Sheets

MANAGING SIGNAL DELIVERY TO A PLURALITY OF DISPLAY PLATFORMS

BACKGROUND OF THE INVENTION

1. Field of the Invention

The present invention relates generally to satellite video systems, and in particular, to a method, apparatus, and article of manufacture for mobile streaming services in conjunction with satellite television broadcast systems.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

Mobile communications, both through cellular and satellite communications systems, have also become commonplace. Mobile telephone users now have services that connect their mobile devices to the interne, stream video, and download music and other data streams. Mobile device users that also have satellite or cable television systems also want to have television shows delivered to their mobile devices.

Satellite and cable providers want to provide this service, however, such providers need to ensure that unauthorized users are not accessing satellite and cable resources. In the typical satellite/cable delivery system, the receivers in such systems are authorized and encryption keys are changed on a periodic basis to prevent piracy. Now that the potential receivers, i.e., mobile devices, can move, and need access to the satellite/cable data from multiple locations and are not pre-authorized, it can be seen that there is a need in the art to provide management of access to the satellite/cable data from mobile devices. It can also be seen that there is a need in the art to control access to the data based on actual users of the satellite/cable systems, and to record usage from a given user to ensure that piracy or sharing of the satellite/cable data is not taking place without authorization from the actual satellite/cable account holder.

SUMMARY OF THE INVENTION

To minimize the limitations in the prior art, and to minimize other limitations that will become apparent upon reading and understanding the present specification, the present invention discloses methods and apparatuses for managing the delivery satellite signals to a plurality of display platforms.

A system in accordance with one or more embodiments of the present invention comprises a centralized database, and a plurality of points of presence, each point of presence in the plurality of points of presence coupled to the centralized database, each point of presence comprising a management service and a data cache, wherein the management service maintains a data session with a client based on a comparison of information stored in the data cache and a current client request, the management service further comparing the current client request with the centralized database when the client is denied signal delivery from the system.

Such a system further optionally comprises the centralized database being contacted by a point of presence when the point of presence lacks a record of the client, the client being a mobile phone, the system delivering satellite signals to the client, and a load balancer, coupled to the plurality of points of presence, for balancing the requests at the plurality of points of presence.

A method for managing client access to data in accordance with one or more embodiments of the present invention comprises receiving a session identifier from a client at a point of presence in a plurality of points of presence, storing the session identifier in a data cache at the point of presence and in a centralized database, receiving a data request from the client, comparing the data request to the session identifier, and maintaining a data session with the client based on the comparison of information stored in the data cache and the data request, wherein the data request is further compared with the centralized database when the client is denied access.

Such a method further optionally comprises the centralized database being contacted by a point of presence when the point of presence lacks a record of the client, the client being a mobile phone, the data comprising satellite data signals, and balancing the load of session identifiers and data requests between the plurality of points of presence.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
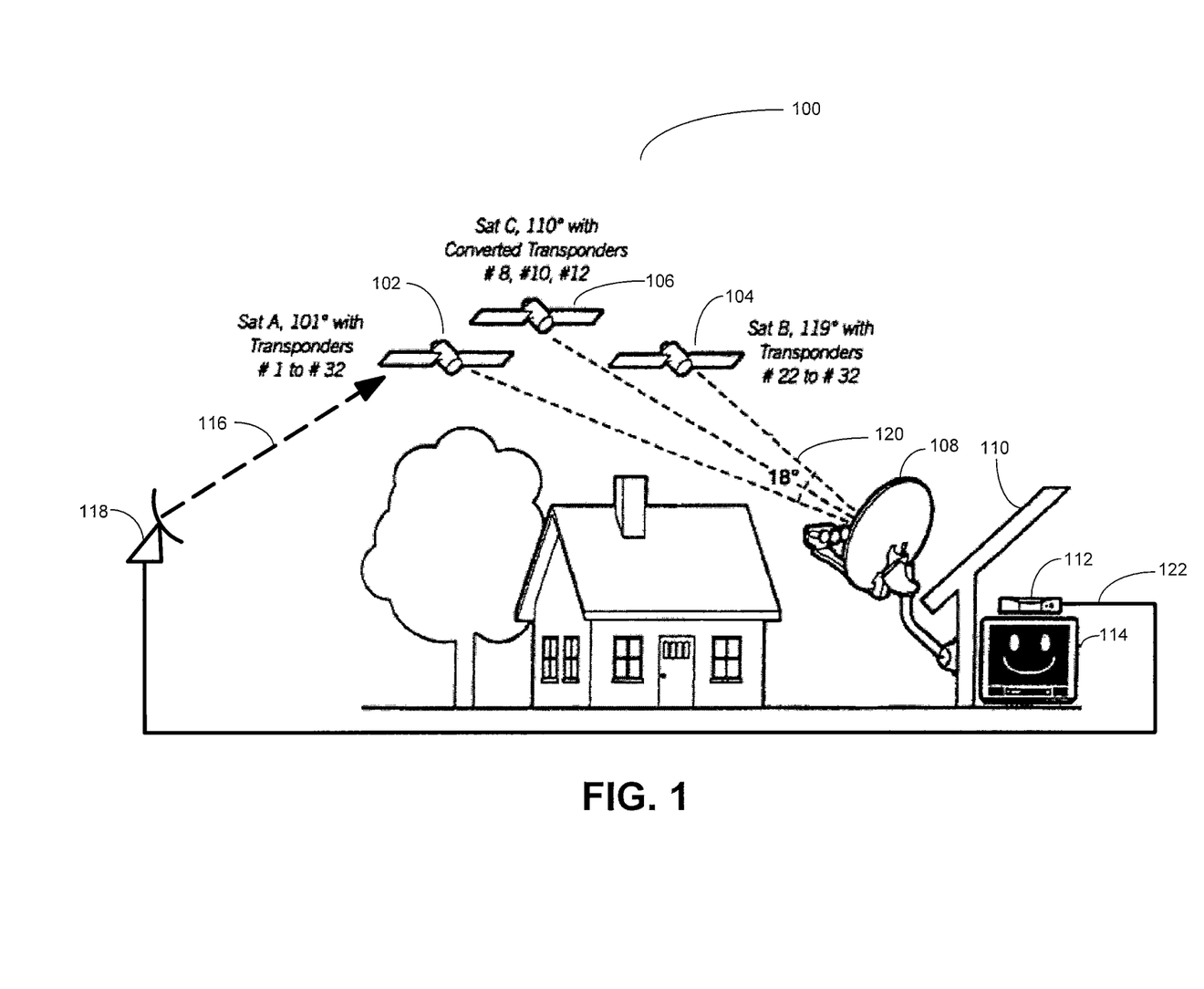
FIG. 1 illustrates a typical satellite television installation of the related art.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location.

Satellite uplink signals 116 are transmitted by one or more uplink facilities 118 to the satellites 102-104 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz. Future satellites will likely broadcast in the Ka-band of frequencies, i.e., 18-40 GHz, but typically 20-30 GHz.

Viewers also may be away from their television sets that are connected to IRD 112, and, as such, typically cannot see any of the broadcast downlink signals 120 in other locations, such as at work or in their autos.

Figure 2:
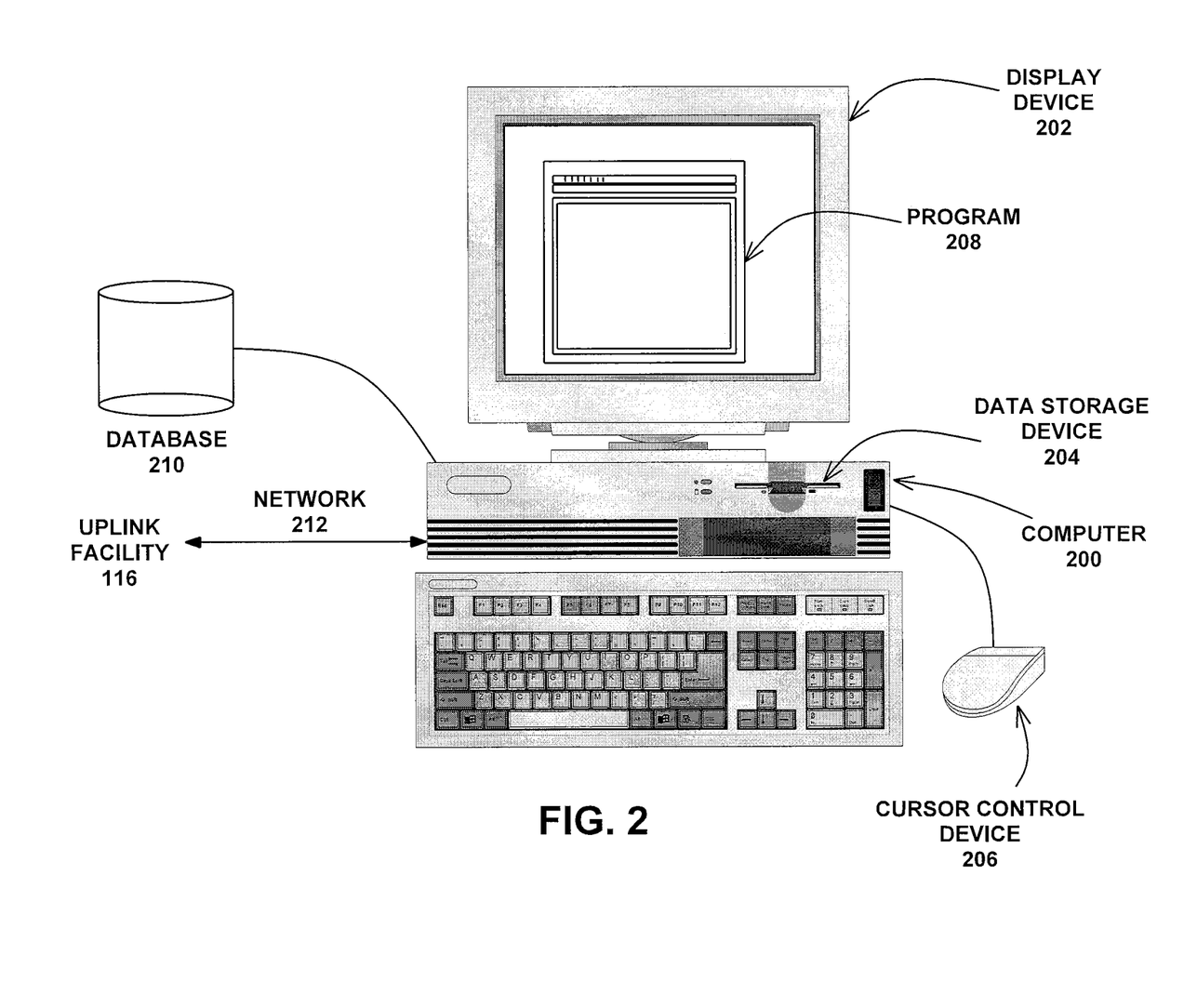
FIG. 2 is an exemplary hardware and software environment used to implement one or more embodiments of the invention.

FIG. 2 is an exemplary hardware and software environment used to implement one or more embodiments of the invention.

Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 200. Further, computer 200 may be a cellular telephone, personal data assistant, etc., rather than a desktop or laptop computer 200.

One or more embodiments of the invention are implemented by a computer-implemented program 208, wherein the program 208 is represented by a window displayed on the display device 202.

Generally, the program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc. Further, the program 208 may utilize a database 210 such as a spatial database.

Computer 200 may also be connected to other computers 200 (e.g., a client or server computer) via network 212 comprising the Internet, LANs (local area network), WANs (wide area network), or the like. Further, database 210 may be integrated within computer 200 or may be located across network 212 on another computer 200 or accessible device. Further, uplink facility 118 may send data directly to computer 200 via link 122, and/or wireless networks such that computer 200 can receive the pertinent portion of the uplink signals 116. Uplink facility 118 may send the pertinent portions of uplink signals 116 to a third party for distribution if desired.

Those skilled in the art will recognize that the exemplary environment illustrated in FIG. 2 is not intended to limit the present invention. Indeed, those skilled in the art will recognize that other alternative environments may be used without departing from the scope of the present invention.

System Overview

Figure 3:
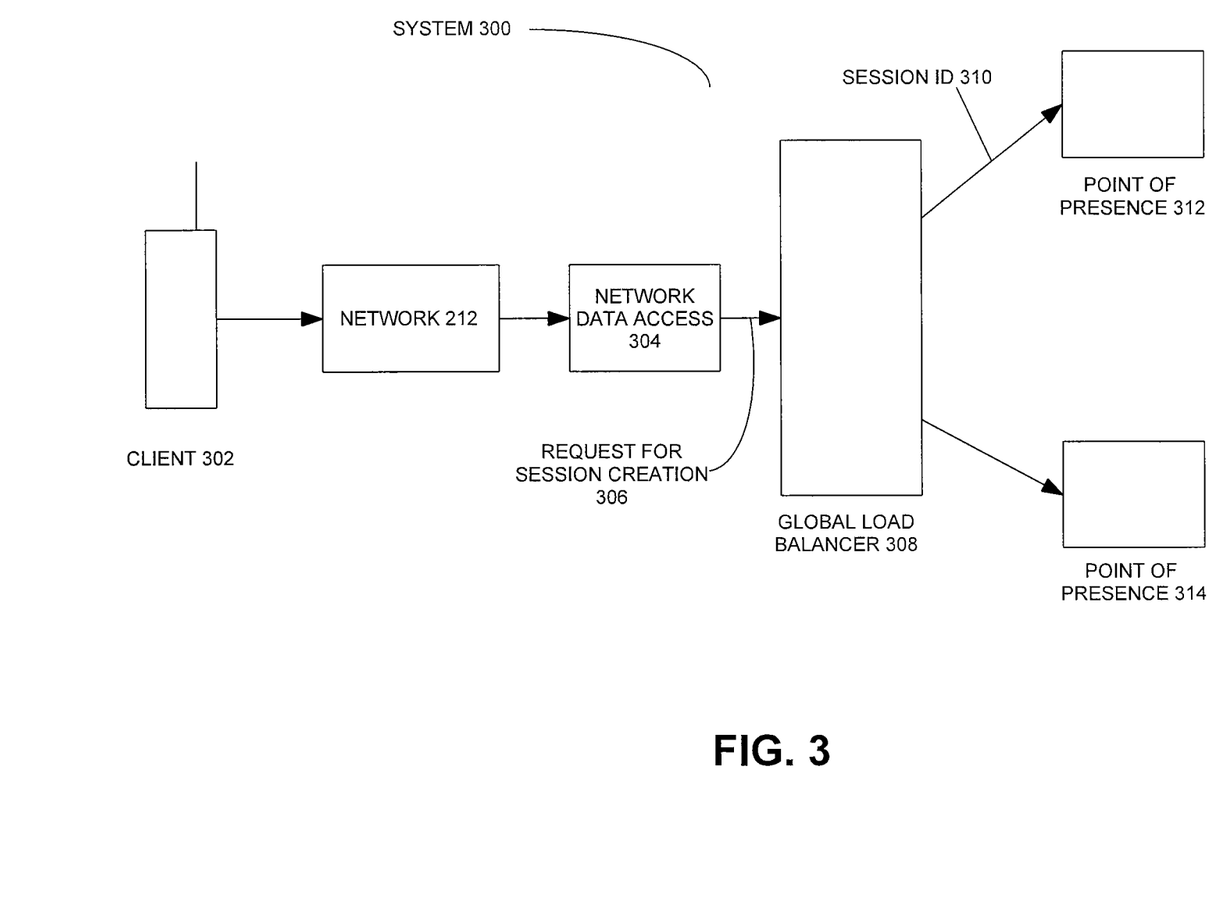
FIG. 3 is a system level overview of one or more embodiments of the present invention.

FIG. 3 is a system level overview of one or more embodiments of the present invention.

System 300 illustrates client 302, which is typically a cellular telephone, but can be a personal data assistant, mobile computer, tablet, or any computing device without departing from the scope of the present invention. Client 302 accesses network 212, which can be a private network or a public network such as the Internet.

Upon accessing network 212, client 302 then navigates to a network data access 304 point, which is typically a logon web page that is associated with the data provider. To access the data authorization section of the website, client 302 must provide network data access 304 point with user authorization materials, such as an account number and password, or other identifying information about the user or owner of the account associated with the data provider, such that desired data from the data provider can be delivered to client 302.

Once proper authentication has been made to the network data access 304 point, system 300 considers client 302 as making a data request, which is also referred to as creating a data session within system 300. This request for session creation 306 is typically timestamped and passed along to global load balancer 308 for routing to a Point Of Presence (POP) 312 or 314.

Global load balancer 308 uses one or more characteristics related to the request for session creation 306 to determine which POP 312/314 to route the session request 306 to. For example, one of the POPs 312/314 may be handling more sessions than the other, and thus, to provide better throughput to the system 300, global load balancer 308 would route request 306 to the POP 312/314, as session identifier 310, to the POP 312/314 that is not as busy as the other POP 312/314. Further, characteristics of the client 302, e.g., the Internet Protocol (IP) address, the Domain Name System (DNS) identifier of client 302, the network or physical location of client 302 with respect to the POPs 312/314, etc., may be used to selectively route request 306 to a given POP 312/314. The rule set provided to the global load balancer 308 may utilize one or more of these characteristics without departing from the scope of the present invention. Further, there may be additional POPs 312/314 included without departing from the scope of the present invention. In such cases, the global load balancer 308 would balance loads of the various POPs 312/314 in system 300.

Figure 4:
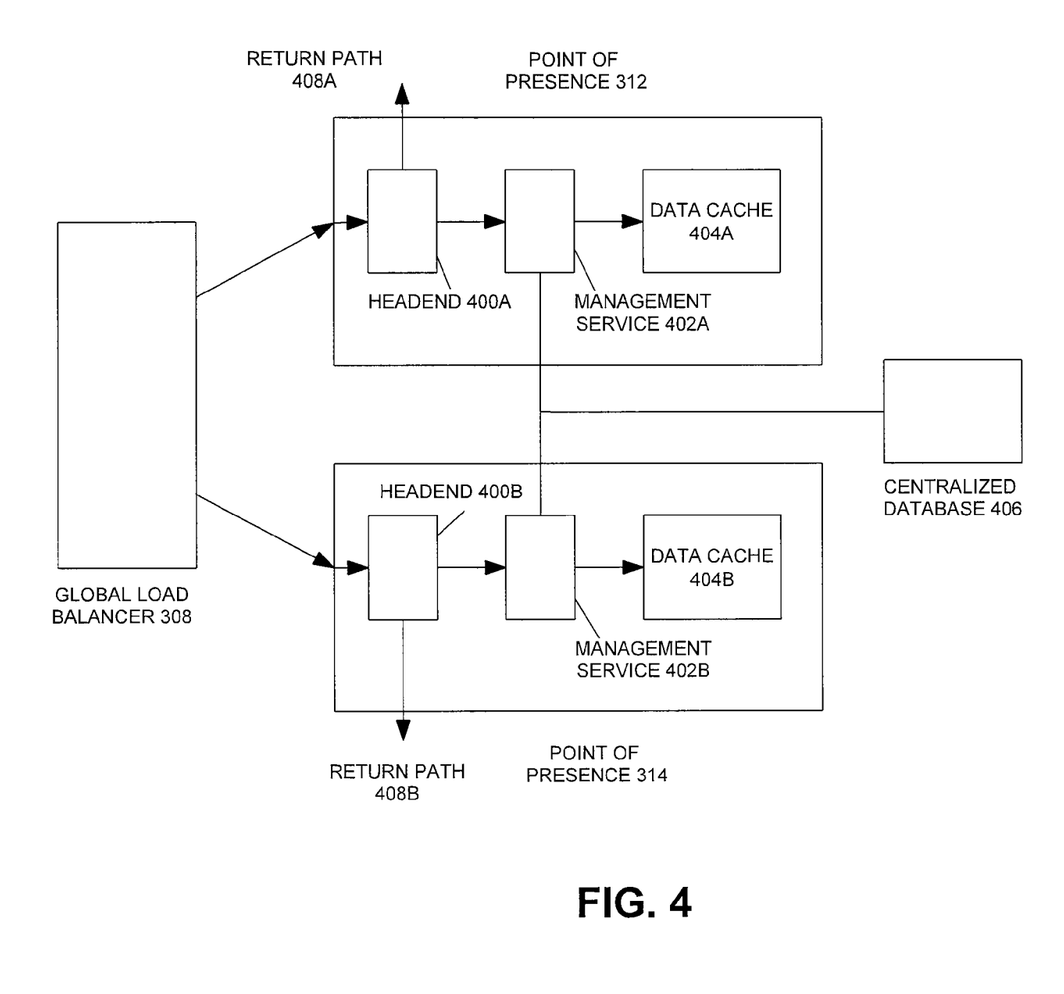
FIG. 4 illustrates details of the points of presence in one or more embodiments of the present invention.

FIG. 4 illustrates details of the points of presence in one or more embodiments of the present invention.

Each POP 312/314 comprises a headend 400, a management service point 402, and a data cache 404. For ease of explanation, POP 312 comprises headend 400A, management service point 402A, and data cache 404A, and POP 314 comprises headend 400B, management service point 402B, and data cache 404B.

Once session ID 310 is forwarded to one of the POPs 312/314, for example to POP 314, the client 302 has access to the data services and data that is associated with the user account used at login at the network data access 304 point. This session ID 310 is then forwarded to headend 400A, which comprises the statistics, data, and data pointers to locations within a data network (e.g., a Content Data Network) such that these statistics, data, and data pointers can be provided to client 302 via return data path 408B (or 408A). Session ID 310 is also forwarded to management service 402A, and the session ID 310 is stored in data cache 404B and in centralized database 406.

If session ID 310 is initially forwarded to POP 314, then POP 312 is unaware of any session ID 310 associated with client 302. So long as the data session ID 310 for client 302 remains with POP 314 for subsequent data requests, e.g., a request for a sports score, a request for a streaming video, etc., then POP 312 does not need to have any knowledge of data session ID 310. Typically, when client 302 is not mobile, such conditions are typical, and a data session ID 310 remains with one POP 312 or POP 314 throughout the session ID 310.

However, because of demands on the POPs 312/314, there will be times when global load balancer 308 will switch session ID 310 from one POP 312 to another POP 314. The present invention provides methods for minimizing data traffic between POPs 312/314 and centralized database 208 to allow for more efficient service to clients 302 in system 300.

Session Creation and Data Transfer Completely Within One POP

Figure 5:
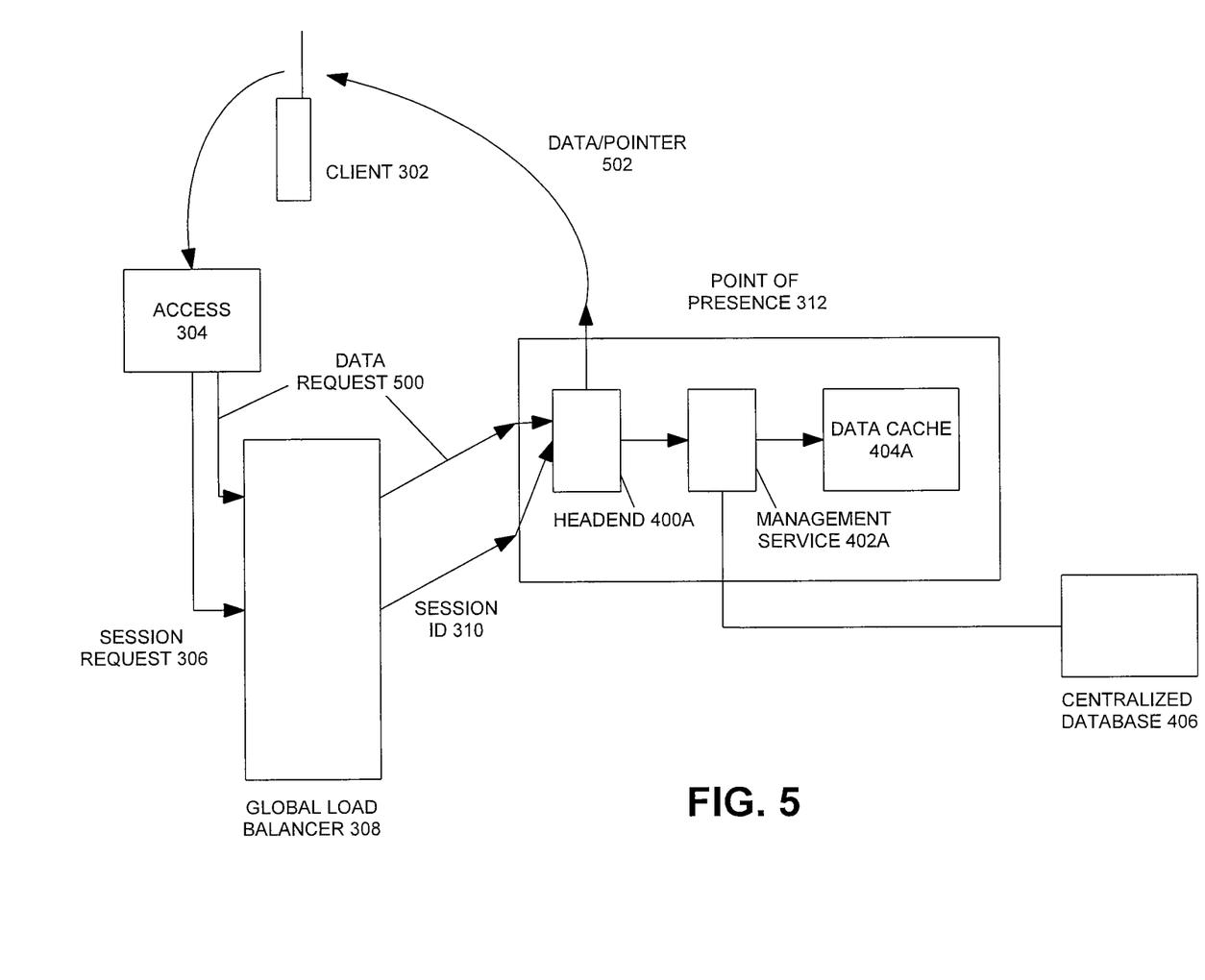
FIG. 5 illustrates session creation and data transfer within one point of presence in accordance with one or more embodiments of the present invention.

FIG. 5 illustrates session creation and data transfer within one point of presence in accordance with one or more embodiments of the present invention.

Session Creation

Client 302 sends a request to access point 304, along with identifying information such as account numbers and passwords, etc., along with client 302 identification information, e.g., Mobile identification number/electronic serial number of the client 302, DNS of the client 302, or other indicators that uniquely identify client 302. Access point 304 allows client 302 to create a session request 306 if client 302 provides proper authentication credentials, which are then sent, along with the client 302 unique identification indicators, to global load balancer 308. Based on the ruleset for balancing session requests 306, global load balancer 308 sends a session ID 310, with a timestamp for the session ID 310, to one of the POPs, in this example to POP 312. The session ID 310 is passed to headend 400A, which ensures that session ID 310 is only allowed access to those data points and data streams that the user credentials are allowed access to, and, if desired, allows the client 302 to upgrade service and data availability with corresponding payment and/or additional authorizations as needed by the service provider. The session ID 310, along with the timestamp for session ID 310, is then sent to management service 402A, which stores the session ID 310 and timestamp in data cache 404A and also stores the session ID 310 and client 302 unique identifier in centralized database 406.

Data Request

At some later point in time, client 302 makes a data request 500, along with a timestamp associated with data request 500, through access point 304. Access point 304 forwards data request 500 to global load balancer 308, which, in this example, based on the ruleset, forwards the data request 500 to POP 312. The data request 500 is then reviewed to ensure that the client 302 is authorized to receive the data requested in data request 500, and, before the data is sent to client 302, management service 402A checks that the data request 500, and the timestamp associated with data request 500, are related to an active session ID 310 in POP 314. Management service 402A compares the data request 500 characteristics, e.g., the client 302 identification, the user authorization levels, etc. against those session IDs 310 that are stored in local data cache 404B.

The comparison of the data request 500 to session IDs 310, in this case, determines that there is a matching session ID 310 to the data request 500. However, a further check of the data request 500 is required to ensure that the data request 500 is made within a predetermined time period of initiation the session. As such, the timestamps of session ID 310 and data request 500 are compared, and, if the elapsed time between session ID 310 creation and data request 500 is not greater than a predetermined "timeout" period of time, then management service 402A will allow data and/or data pointers 302 to be returned to client 302 from headend 400A, and will update the data cache 404A by replacing some or all of session ID 310's data. So, for example, management service 402A can merely update the timestamp associated with session ID 310, which would then be used in comparison with subsequent data requests 500 from client 302, or the entire record of session ID 310 can be altered, appended to, or replaced with data request 500 for management and tracking purposes to determine the usage of POP 312 for a given client 302 and/or user account.

Once data and/or data pointer 502 is returned to client 302, client 302 then can display the data or access a data network to receive the requested data from headend 400A or a network 212 associated with the requested data of data request 500. This review of client 302's access to system 300 continues when a new data request 500 is made, such that client 302, should global load balancer 308 continue to direct data requests 500 to POP 314, maintains a session with headend 200A and thus data can be sent to client 302 as requested.

At some point in time, management service 402A will also update centralized database 406 with the data in the data cache 404A. So, for example, if the timeout period for sessions within system 300 is ten minutes, then at some time period less than ten minutes, say five minutes, management service 402A will send data from data cache 404A that has been updated within the past five minutes to centralized database 406. Any session information that has not been updated can also be sent, however, since that data was already sent to centralized database 406 upon creation or was sent during the last update, such data transmission from POP 312 to centralized database 406 is redundant and would create additional unnecessary data traffic in system 300.

So long as client 302 continues to make data requests 500 within a time period less than the timeout period, and global load balancer 308 continues to send the data requests to POP 312 (i.e., the same POP that the original session ID 310 was sent to), then client 302 can access all authorized data for the user account associated with client 302 provided at access point 304. If client 302 does not make a data request 500 within the timeout period, then the comparison made by management service 202A between the current data request 500 and the timestamp of the prior data request 500 (or the session ID 310 timestamp) will indicate that the client 302 has "timed out," or, in other words, no longer has an active session with that POP 312. The headend 400A can then send a message to client 302 that a new login is required at access point 304, or other actions may take place as described below, because the global load balancer 308 may have sent the current data request 500 to a different POP than the prior data request 500 (or the session ID 310).

Independently, or through the control of management service 402A, data cache 404A and centralized database 406 will periodically be cleared of session IDs 310 and/or data requests 500 that exceed a predetermined threshold. So, for example, any session ID 310 or data request 500 that has a timestamp that is more than fifteen minutes old will be purged from data cache 404 and centralized database 406. This clearing of older data can be run as part of the management service 402 or as an independent "background" task within system 300.

Session Creation and Data Transfer With Switching From One POP To Another

Figure 6:
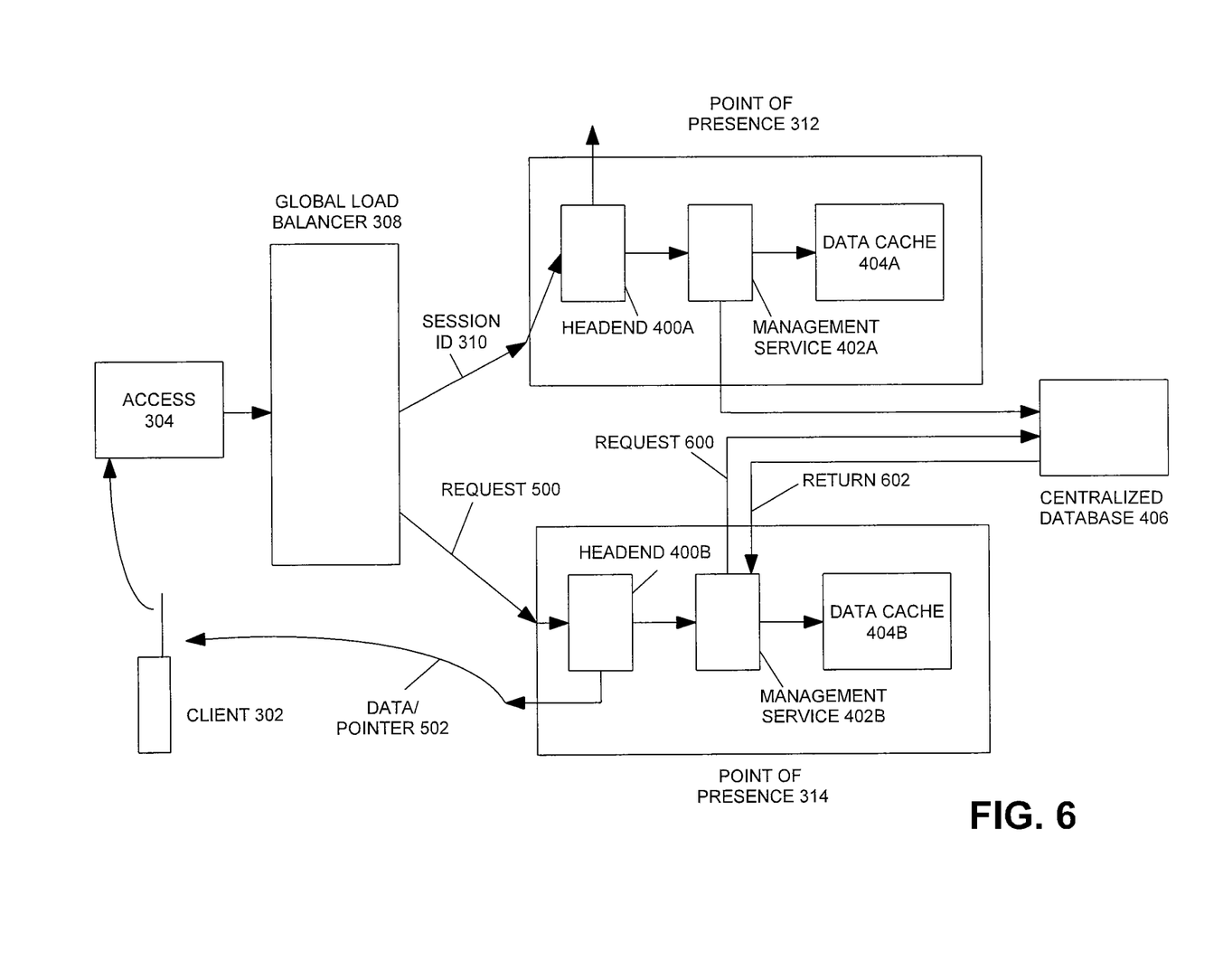
FIG. 6 illustrates session creation and data transfer with switching between points of presence in accordance with one or more embodiments of the present invention.

FIG. 6 illustrates session creation and data transfer with switching between points of presence in accordance with one or more embodiments of the present invention.

Session Creation

As described with respect to FIG. 3, client 302 sends a request to access point 304, along with identifying information such as account numbers and passwords, etc., along with client 302 identification information, e.g., Mobile identification number/electronic serial number of the client 302, DNS of the client 302, or other indicators that uniquely identify client 302. Access point 304 allows client 302 to create a session request 306 if client 302 provides proper authentication credentials, which are then sent, along with the client 302 unique identification indicators, to global load balancer 308. Based on the ruleset for balancing session requests 306, global load balancer 308 sends a session ID 310, with a timestamp for the session ID 310, to one of the POPs, in this example to POP 312. The session ID 310 is passed to headend 400A, which ensures that session ID 310 is only allowed access to those data points and data streams that the user credentials are allowed access to, and, if desired, allows the client 302 to upgrade service and data availability with corresponding payment and/or additional authorizations as needed by the service provider. The session ID 310, along with the timestamp for session ID 310, is then sent to management service 402A, which stores the session ID 310 and timestamp in data cache 404A and also stores the session ID 310 and client 302 unique identifier in centralized database 206.

Data Request

At some later point in time, client 302 makes a data request 500, along with a timestamp associated with data request 500, through access point 304. Access point 304 forwards data request 500 to global load balancer 308, which, in this example, based on the ruleset, forwards the data request 500 to POP 314 instead of POP 312.

The data request 500 is then reviewed to ensure that the client 302 is authorized to receive the data requested in data request 500, and, before the data is sent to client 302, management service 402B checks that the data request 500, and the timestamp associated with data request 500, are related to an active session ID 310 in POP 314. Since the original session creation was sent to POP 312 and not POP 314, management service 402B searches data cache 404B and finds no record of a session ID 310 for client 302. Thus, management service 402B then makes a request 600 to centralized database 406, where session ID 310 is found and returned to management service 402B via return 602, because POP 314, via management service 402A, stored the session ID in data cache 404A and in centralized database 406. Management service 402B then compares the data request 500 characteristics, e.g., the client 302 identification, the user authorization levels, etc. against the session ID 310 returned from centralized database 406, and stores data request 500 in local data cache 404B.

The comparison of the data request 500 to session IDs 310 in data cache 404B, in this case, determines that there was not a matching session ID 310 to the data request 500, and thus a request 600 needed to be made to centralized database 406. A further check of the data request 500 is still required to ensure that the data request 500 is made within a predetermined time period of initiation the session. As such, the timestamps of session ID 310 and data request 500 are still compared, and, if the elapsed time between session ID 310 creation and data request 500 is not greater than a predetermined "timeout" period of time, then management service 402B will allow data and/or data pointers 502 to be returned to client 302 from headend 400B, and will update the data cache 404B by replacing some or all of session ID 310's data in data cache 404B.

Multiple Access Management

Management service 202 also controls the number of users receiving data/pointer 502. For example, when client 302 logs in through access point 304, the session ID 310 created is unique to that specific client 302. When another client attempts to log in to access point 304 for the same user, either access point 304, management service 402, or both, know that there is already one client 302 logged in to that particular user account and has created session ID 310, and thus prevents any other clients 302 from logging in and creating a session ID 310 for that user. Some user accounts may allow multiple clients 302 if desired, or, if desired, when the second client logs in to access point 304, the old session ID 310 may be replaced with a new session ID.

Process Chart

Figure 7:
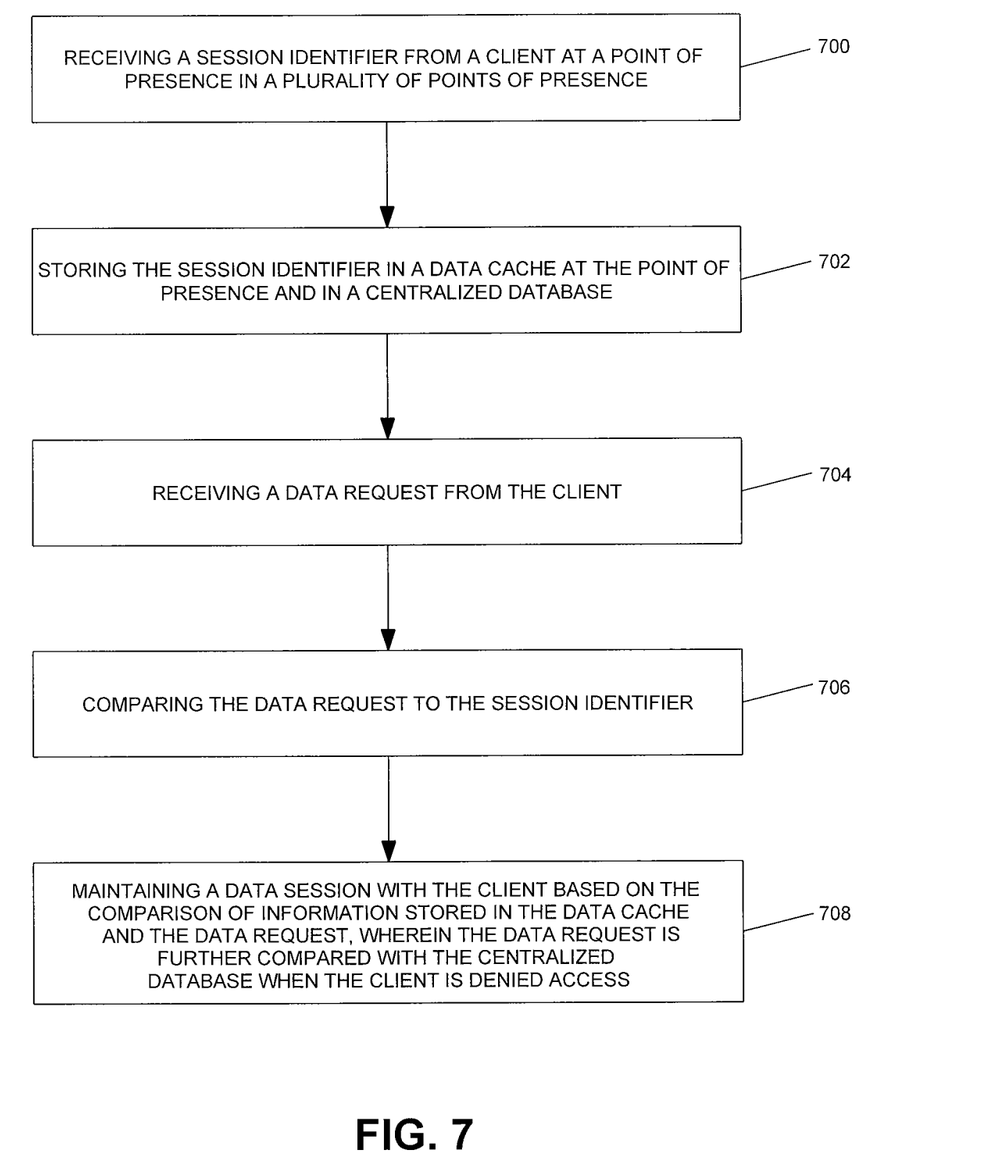
FIG. 7 illustrates a process chart in accordance with one or more embodiments of the present invention.

FIG. 7 illustrates a process chart in accordance with one or more embodiments of the present invention.

Box 700 illustrates receiving a session identifier from a client at a point of presence in a plurality of points of presence.

Box 702 illustrates storing the session identifier in a data cache at the point of presence and in a centralized database.

Box 704 illustrates receiving a data request from the client.

Box 706 illustrates comparing the data request to the session identifier.

Box 708 illustrates maintaining a data session with the client based on the comparison of information stored in the data cache and the data request, wherein the data request is further compared with the centralized database when the client is denied access.

Conclusion

The present invention discloses methods, apparatuses, and systems for managing signal delivery to a plurality of display platforms. A system in accordance with one or more embodiments of the present invention comprises a centralized database, and a plurality of points of presence, each point of presence in the plurality of points of presence coupled to the centralized database, each point of presence comprising a management service and a data cache, wherein the management service maintains a data session with a client based on a comparison of information stored in the data cache and a current client request, the management service further comparing the current client request with the centralized database when the client is denied signal delivery from the system.

Such a system further optionally comprises the centralized database being contacted by a point of presence when the point of presence lacks a record of the client, the client being a mobile phone, the system delivering satellite signals to the client, and a load balancer, coupled to the plurality of points of presence, for balancing the requests at the plurality of points of presence.

A method for managing client access to data in accordance with one or more embodiments of the present invention comprises receiving a session identifier from a client at a point of presence in a plurality of points of presence, storing the session identifier in a data cache at the point of presence and in a centralized database, receiving a data request from the client, comparing the data request to the session identifier, and maintaining a data session with the client based on the comparison of information stored in the data cache and the data request, wherein the data request is further compared with the centralized database when the client is denied access.

Such a method further optionally comprises the centralized database being contacted by a point of presence when the point of presence lacks a record of the client, the client being a mobile phone, the data comprising satellite data signals, and balancing the load of session identifiers and data requests between the plurality of points of presence.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto and the full range of equivalents of the claims.

What is claimed is:

1. A method for managing signal delivery to a plurality of display platforms, comprising:
   logging a first client into a user account of a data provider;
   creating a first data session between the first client and a first point of presence, wherein:
      during the first data session, the first client has access to data services and data associated with the user account;
      the first data session is associated with a first session ID; and
      a number of sessions that are active for the user account are controlled;
   storing the first session ID in a centralized database;
   receiving a request for data from the first client; and
   ensuring that the first data session is active based on a comparison of the request for data and the first session ID, wherein:
      the comparison is based on a search of the local data cache of the first point of presence for the first session ID; and
      if the local data cache does not contain the first session ID, the comparison further includes a search of centralized database for the first session ID.

2. The method of claim 1, wherein the first data session is created between the first client and the first point of presence by a global load balancer that utilizes one or more characteristics of the first client request for session creation to determine a point of presence to route the client request to.

3. The method of claim 1, wherein the first data session is not active if a predetermined threshold period of time between requests for data has been exceeded.

4. The method of claim 1, wherein the number of sessions that are active for the user account are controlled by:
   receiving a login request from a second client to log into the user account;
   based on the first session ID created for the first client, preventing the second client from logging into user account and preventing the creation of a second session ID for the second client.

5. The method of claim 1, wherein the number of sessions that are active for the user account are controlled by:
   receiving a login request from a second client to log into the user account;
   based on a number of clients logged into and assigned session IDs, determining if a number of allowed session IDs has been exceeded;
   if the number of allowed session IDs has been exceeded, preventing the second client from logging into user account and preventing the creation of a second session ID for the second client.

6. The method of claim 1, wherein the number of sessions that are active for the user account are controlled by:
   receiving a login request from a second client to log into the user account;
   creating a second data session for the second client, wherein:
      the second data session is associated with a second session ID;
      the second session ID replaces the first session ID; and
      access to the data and the data services associated with the user account are limited to active data sessions having corresponding session IDs.

7. The method of claim 1, wherein the centralized database is utilized to manage data sessions across multiple points of presence.

8. The method of claim 1, wherein the data and the data services comprises satellite/cable data.

9. The method of claim 1, wherein the first client comprises a mobile device.

10. A system for managing signal delivery to a plurality of display platforms, comprising:
    a data provider computer;
    a network data access point application, wherein the network data access point is configured to:
       log a first client into a user account of the data provider computer, wherein:
          a first data session is created between the first client and a first point of presence;
          during the first data session, the first client has access to data services and data associated with the user account;
          the first data session is associated with a first session ID; and
          a number of sessions that are active for the user account are controlled;
    a centralized database configured to store the first session ID;
    the first point of presence configured to:
       receive a request for data from the first client; and
       ensure that the first data session is active based on a comparison of the request for data and the first session ID, wherein:
          the comparison is based on a search of the local data cache of the first point of presence for the first session ID; and
          if the local data cache does not contain the first session ID, the comparison further includes a search of centralized database for the first session ID.

11. The system of claim 10, further comprising a global load balancer that is configured to create the first data session the first client and the first point of presence, wherein the global load balancer utilizes one or more characteristics of the first client request for session creation to determine a point of presence to route the client request to.

12. The system of claim 10, wherein the first data session is not active if a predetermined threshold period of time between requests for data has been exceeded.

13. The system of claim 10, wherein the number of sessions that are active for the user account are controlled by:
    receiving a login request from a second client to log into the user account;
    based on the first session ID created for the first client, preventing the second client from logging into user account and preventing the creation of a second session ID for the second client.

14. The system of claim 10, wherein the number of sessions that are active for the user account are controlled by:
    receiving a login request from a second client to log into the user account;
    based on a number of clients logged into and assigned session IDs, determining if a number of allowed session IDs has been exceeded;
    if the number of allowed session IDs has been exceeded, preventing the second client from logging into user account and preventing the creation of a second session ID for the second client.

15. The system of claim 10, wherein the number of sessions that are active for the user account are controlled by:

receiving a login request from a second client to log into the user account;

creating a second data session for the second client, wherein:

the second data session is associated with a second session ID;

the second session ID replaces the first session ID; and access to the data and the data services associated with the user account are limited to active data sessions having corresponding session IDs.

16. The system of claim 10, wherein the centralized database is further configured to manage data sessions across multiple points of presence.

17. The system of claim 10, wherein the data and the data services comprises satellite/cable data.

18. The system of claim 10, wherein the first client comprises a mobile device.

* * * * *